US009438036B2

(12) United States Patent
Kaluzny et al.

(10) Patent No.: US 9,438,036 B2
(45) Date of Patent: Sep. 6, 2016

(54) SYSTEMS AND METHODS FOR BYPASSING A VOLTAGE REGULATOR

(71) Applicants: Richard John Kaluzny, Greenfield, WI (US); Daniel Joseph Daley, Waukesha, WI (US)

(72) Inventors: Richard John Kaluzny, Greenfield, WI (US); Daniel Joseph Daley, Waukesha, WI (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 381 days.

(21) Appl. No.: 13/829,587

(22) Filed: Mar. 14, 2013

(65) Prior Publication Data

US 2014/0265637 A1 Sep. 18, 2014

(51) Int. Cl.
*H02J 1/00* (2006.01)
*G05F 1/14* (2006.01)

(52) U.S. Cl.
CPC . *H02J 1/00* (2013.01); *G05F 1/14* (2013.01); *Y10T 307/826* (2015.04)

(58) Field of Classification Search
CPC ......... H02J 1/00; G05F 1/14; Y10T 307/826
See application file for complete search history.

(56) References Cited

U.S. PATENT DOCUMENTS 1,874,824 A * 8/1932 Snyder .................... H01F 29/04 307/102
22,224 A * 11/1942 Bronaugh et al. ...... G05F 1/247 323/256
3,255,322 A 6/1966 Ball et al.
3,335,237 A * 8/1967 Kelly ....................... H01H 9/26 200/325
4,419,619 A * 12/1983 Jindrick et al. ............... 323/257
4,713,500 A 12/1987 Osborne
5,450,002 A * 9/1995 Dunk ............................ 323/257
5,550,459 A * 8/1996 Laplace ........................ 323/255
5,625,280 A * 4/1997 Voldman ....................... 323/284
5,646,459 A 7/1997 Hatate et al.
5,770,959 A * 6/1998 Hopkins et al. .............. 327/143
6,072,305 A * 6/2000 Trainor et al. ................ 323/255
6,327,162 B1 * 12/2001 Larsen .................. H02J 3/1814 307/103
7,049,795 B2 * 5/2006 Beckwith ...................... 323/258
7,196,279 B1 3/2007 Roberts
7,212,067 B2 * 5/2007 Pasternak ..................... 327/541
7,526,674 B2 * 4/2009 Bailey et al. ................... 714/14
7,582,989 B2 * 9/2009 Burr ..................... H01H 47/005 307/115
7,627,948 B2 12/2009 Roberts
7,915,766 B2 * 3/2011 Hernandez et al. .......... 307/137
8,009,404 B2 * 8/2011 Blinder et al. ................ 361/160
2005/0104567 A1 * 5/2005 Beckwith .................. G05F 1/14 323/258
2007/0137990 A1 6/2007 Jorgensen
2008/0238378 A1 10/2008 Uan-Zo-Li et al.
2010/0188066 A1 * 7/2010 Rodenhiser ............. H02J 9/062 323/302

(Continued)

OTHER PUBLICATIONS

Siemens Energy, Inc., "MJ-4A(TM) and MJ-4B(TM) Voltage Regulator Control Panel Installation and Operations Manual", Manual No. 21-115-527-023 rev02, 92 Pages.

(Continued)

*Primary Examiner* — Thienvu Tran
*Assistant Examiner* — Pinping Sun
(74) *Attorney, Agent, or Firm* — King & Spalding LLP

(57) ABSTRACT

A system having voltage regulator bypass means provides a means for preventing a voltage regulator to be bypassed in a power system when the difference between a load side voltage of the voltage regulator and a source side voltage of the voltage regulator is not below a certain threshold or substantially small. A voltage regulator controller can also prevent the voltage regulator from being bypassed when a tap changer of the voltage regulator is not in a neutral position.

19 Claims, 4 Drawing Sheets

(56) References Cited

U.S. PATENT DOCUMENTS

| | | | | |
|---|---|---|---|---|
| 2011/0292705 | A1* | 12/2011 | Fornage | 363/131 |
| 2012/0169141 | A1* | 7/2012 | Divan | H01H 83/10 307/125 |
| 2012/0274297 | A1 | 11/2012 | Brown et al. | |

OTHER PUBLICATIONS

Inertia Engineering & Machine Works, Inc., "High Voltage Switchgear & Automation Equipment, Section 4, Specialty Switches", Cat. No. 040930G. May 2008, 14 Pages.

S&C Electric Company, "S&C Regulator Bypass Switches, Type XL (Sequenced) and Type NL (Nonsequenced), Outdoor Distribution (14 4 kv and 25 kv)", Descriptive Bulletin 841-30, Jan. 9, 1989, 8 Pages.

Cooper Power Systems, "Voltage Regulators, CL-6 Series Control Installation, Operation, and Maintenance Instructions", Service Information, S225-11-1, Feb. 2009, 110 Pages (submitted in three parts due to file size).

International Search Report and Written Opinion from Corresponding Application PCT/US2014/025628, mailed Jul. 31, 2014, 6 sheets.

* cited by examiner

SYSTEMS AND METHODS FOR BYPASSING A VOLTAGE REGULATOR

TECHNICAL FIELD

The present disclosure relates generally to bypassing a voltage regulator in a power system. More specifically, the present disclosure relates to preventing a voltage regulator from being bypassed when certain safe bypass conditions are not met.

BACKGROUND

The practice of bypassing a regulator is fairly common. Bypassing is done in order to avoid power disruptions when installing or removing a regulator from service. If it is not done properly, i.e.—the regulator is bypassed while the tap changer is not in the neutral position (commonly referred to as "Bypass off Neutral"), serious damage can result. When the tap changer is not in the neutral position, a voltage exists between the source and load bushings of the regulator. Bypassing the regulator creates a short circuit between the source and load bushings through the bypass switch. If the series winding has not been taken out of the circuit by moving the tap changer to the neutral position, the voltage across the source and load bushings can drive a very large current through the regulator series winding and bypass switch. This large current can burn insulation, create arcing, melt windings, and lead to a rupture of the regulator tank. Because of the typically small number of series turns involved, the ratio of series turns to shunt turns can be very small. This means that even though a very large bypass current is flowing in the series winding, a much smaller current is reflected into the shunt winding. This current can be near or below rated load current. As a result, upstream protection may, be unable to detect the situation until a ground fault occurs. Therefore, the protective equipment upstream of the device often cannot sense and/or cannot respond quickly enough to prevent the failure from becoming catastrophic.

Traditionally, the method for ensuring a safe bypass operation is a manual process in which the user is recommended to verify that the regulator tap changer is in the neutral position and no voltage differential is present between the load and source sides of the bypass switch and voltage regulator. Typically, such verification includes four possible methods: 1) verify that a neutral indicator light on the control is indicating the neutral position; 2) verify that the tap position display on the regulator control interface indicates the neutral position; 3) verify that the mechanical position indicator on the regulator is in the neutral position; and 4) verify by measurement that there is no voltage difference between the source and load bushing. Such methods are typically dependent upon the observation, judgment, knowledge, and conscientiousness of the user. Thus, such existing methods can be prone to human error.

SUMMARY

In an example embodiment, a system with voltage regulator bypass includes a voltage regulator, a bypass switch coupled to the voltage regulator, and between a source and a load, the bypass switch comprising a first state and a second state. In the first state, the bypass switch electrically couples the source to the voltage regulator and the voltage regulator to the load, establishing a conductive path between the source and load via the voltage regulator. In the second state, the bypass switch electrically couples the source directly to the load, bypassing the voltage regulator. The system further includes a bypass switch controller coupled to the bypass switch, wherein the bypass switch controller controls whether the bypass switch is put into the first state or the second state, and a voltage regulator controller coupled to the bypass switch controller and the voltage, regulator, wherein the voltage regulator controller prevents the bypass switch controller from putting the bypass switch into the second state unless one or, more bypass conditions are met.

In another example embodiment, a voltage regulator bypass controller includes a logic controller configured to couple to a bypass switch controller, wherein the bypass switch controller is coupled, to and controls a bypass switch. When the logic controller is coupled to the bypass controller, the logic controller prevents the bypass switch controller from actuating the bypass switch unless one or more bypass conditions are met.

In another example embodiment, a method of bypassing a voltage regulator includes receiving a plurality of inputs from a voltage regulator, and determining if a bypass condition has been met based on at least the inputs from the voltage regulator. If it is determined that the bypass condition is met, then permit a bypass switch controller to actuate a bypass switch and put the voltage regulator into a bypassed state. If it is determined that the bypass condition is not met, then prevent the bypass switch controller from actuating a bypass switch. The method further includes, preventing the voltage regulator from being put into the bypassed state.

BRIEF DESCRIPTION OF THE DRAWINGS

For a more complete understanding of the example embodiments of the present disclosure and the advantages thereof, reference is now made to the following description in conjunction with the accompanying drawings in, which.

Figure 1:
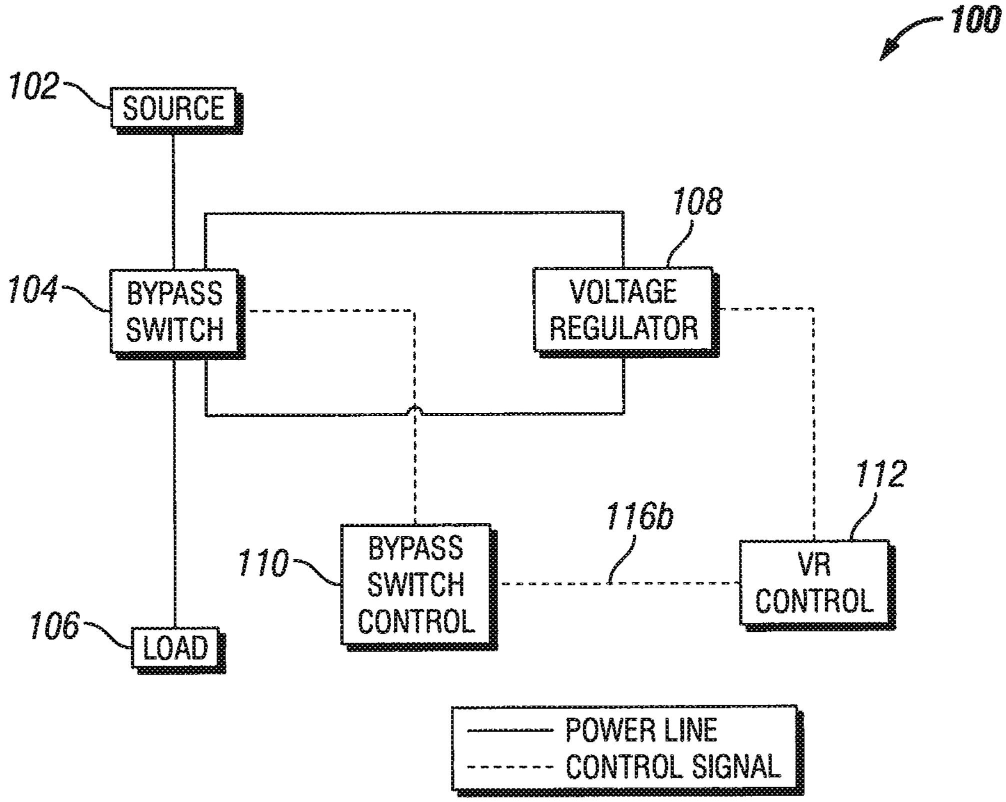
FIG. 1 illustrates an example block diagram of a system with voltage regulator bypassing means, in accordance with certain example embodiments.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

Embodiments of the disclosure are directed to systems and methods for bypassing a voltage regulator in a power system when the voltage regulator is in a neutral state and no voltage differential exists between source and load bushings of the voltage regulator. In the description, well known components, methods, and/or processing techniques are omitted or briefly described so as not to obscure the disclosure. As used herein, the "disclosure" refers to any one of the embodiments described herein and any equivalents, but is not limiting to the embodiments described herein. Furthermore, reference to various feature(s) of the "disclosure" is not to suggest that all embodiments must include the referenced feature(s). The following description of example embodiments refers to the attached drawings.

Turning now, to the drawings, in which like numerals indicate like elements throughout, example embodiments of the disclosure are described in detail.

Turning to FIG. 1, an example power system 100 includes a voltage regulator 108, a bypass switch 104, a bypass switch control 110, and a voltage regulator control 112. In an example embodiment, the bypass switch 104 is coupled to a power source 102 and a load 106. The bypass switch 104 is also coupled to the voltage regulator 108. In an example embodiment, the bypass switch is operable in at least two modes, an on mode and an off mode. The off mode (also called normal mode) is generally applied when the power system 100 is operating normally, and the voltage regulator 108 is to be coupled between the power source 102 and the load 106, thereby regulating voltage delivered to the load 106. Specifically, when the bypass switch 104 is in the off mode, the bypass switch 104 electrically couples the power source 102 to the voltage regulator 108, and the voltage regulator 108 to the load 106. Further, in an example embodiment, when the bypass switch 104 is in the off mode, the power source 102 and load 106 are not coupled directly to each other, and power provided from the power source 102 goes through the voltage regulator 108, and a regulated voltage is provided to the load 106 from the voltage regulator 108. When the bypass switch 104 is in the on mode, the voltage regulator 108 is bypassed and the power source 102 is directly coupled to the load 104. Thus, power from the power source 102 is provided directly to the load 106 without going through, or being regulated by, the voltage regulator 108.

In the example embodiment shown in FIG. 1, the bypass switch 104 is further communicatively coupled to the bypass switch control 110. In an example embodiment, the bypass switch control 110 controls the mode of the bypass switch 104 by sending a bypass control signal to the bypass switch 104, which puts the bypass switch 104 into the off mode or the on mode. The bypass switch control 110 is further communicatively coupled to the voltage regulator control 112, which is communicatively coupled to the voltage regulator 108.

In an example embodiment, the bypass switch control 110 is locked from putting the bypass switch 104 into the on mode if the voltage regulator is not in a neutral state, as determined by the voltage regulator controller 112. Specifically, an output signal from the voltage regulator controller 112 is sent to the bypass switch control 110. The output signal is an indication of whether the voltage regulator is in a neutral state. When the voltage regulator is in the neutral state, there is effectively no voltage difference between the voltage provided to the voltage regulator 108 from the power source 102 and the voltage provided to the load 106 from the voltage regulator 108. Thus, if the voltage regulator 108 were to be bypassed, there would be effectively no voltage difference between the power source 102 and the load 106, and thus, generally no harmful current surge.

An output signal 116*b* is generated by the voltage regulator controller 112 in response to one or more voltage measurements at the voltage regulator 108. Specifically, if, it is detected that the voltage regulator 108 is in the neutral state, the voltage regulator controller 112 sends a signal to the bypass switch control 110 which unlocks the bypass switch control 110, allowing it to put the bypass switch 104 into the on mode, thereby bypassing the voltage regulator 108. However, if it is detected that the voltage regulator 108 is not in the neutral state, the voltage regulator controller 112 sends a signal to the bypass switch control which locks the bypass switch control. When the bypass switch control 110 is locked, it is generally unable to put the bypass switch 104 into the on mode, and the voltage regulator 108 cannot be bypassed. Thus, in general, the voltage regulator 108 can only be bypassed when the voltage regulator 108 is in the neutral state. Various voltage measurement circuits and methods are employable for detecting the neutral state of the voltage regulator 108 in addition to those disclosed herein. In certain example embodiments, in order for the voltage regulator controller 112 to make a neutral determination of the voltage regulator 108, one or more additional conditions must be met, a subset of which is detailed below.

Figure 2:
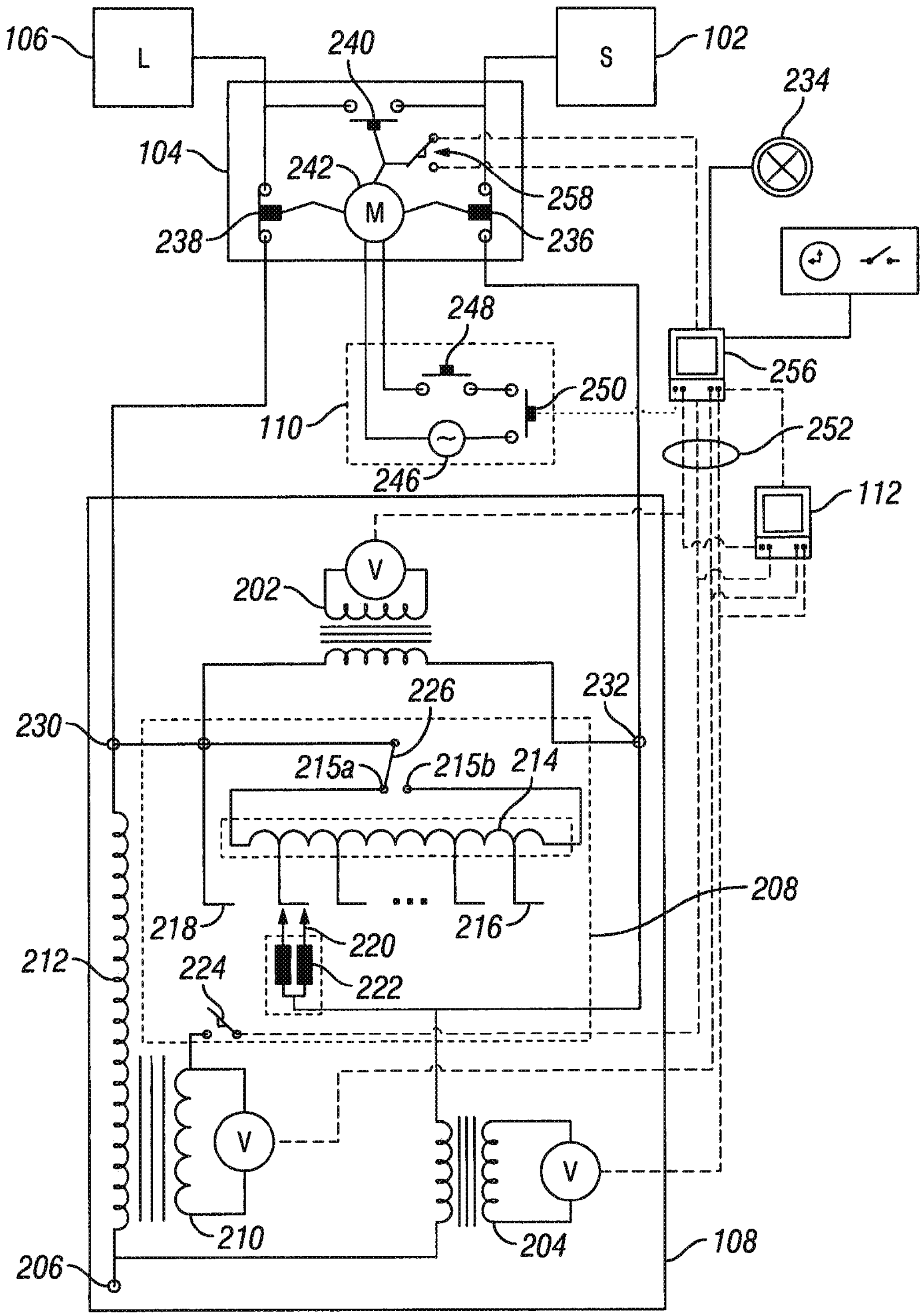
FIG. 2 illustrates an example schematic diagram of certain elements of the system of FIG. 1, in accordance with certain example embodiments.

FIG. 2 illustrates a schematic representation of the power system 100 according to an example embodiment of the present disclosure. Turning to FIG. 2, an example embodiment of the power system 100 includes the voltage regulator 108, a logic controller 256, the bypass switch control 110, the bypass switch 104, the power source 102, and the load 106. In certain example embodiments, the power system 100 may not include the power source 102 and/or the load 106, as certain embodiments of the power system 100 are configured to be coupled to and decoupled from various loads and power sources.

In an example embodiment, the voltage regulator 108 includes a differential potential transformer 202, a potential transformer 204, an auto-transformer 206, and a tap changer 208. In an example embodiment, the auto-transformer 206 is the combination of a shunt winding 212 and a series winding 214. The series winding 214 includes a plurality of taps, and the shunt winding 212 has a fixed ratio to a control winding 210. The tap changer 208 includes movable contacts 220 and stationary contacts 216 individually connected to taps, of the series winding 214. In an example embodiment, the series winding 214 is physically located outside of the tap changer 208. The movable contacts 220 are configured to make contact with one or two of the stationary contacts 216 at a time, thereby effectuating a variable number of windings in the series winding 214. The stationary contacts 216 includes a neutral contact 218, which effectively bypasses the series winding 214. Thus, when the movable contacts 220 are coupled to the neutral contact, no portion of the series winding 214 is, connected between the source and load bushings 232, 230, and the voltage regulator is in the neutral state. Specifically, the series winding 214 and the neutral contact 218 are coupled to the load bushing 230, and the movable contacts 220 is coupled to the source bushing 232. The load bushing 230 is coupled to the load via the bypass switch 104 and the source bushing 232 is coupled to the power source 102 via the bypass switch 104. When the movable contacts 220 are coupled to the neutral contact 218, the load 106 is coupled to the power source 102 via the bypass switch, without going through any windings 214. Thus, the voltage provided at the power source 102 is effectively the same as the voltage provided at the load 106, and the voltage regulator 108 is in the neutral position.

The movable contacts 220 can be further coupled to a preventative autotransformer 222 or other form of impedance to prevent a short circuit condition when the movable contacts 220 are bridging across taps 216 at different electrical potentials. In an example embodiment, the preventative autotransformer 222 is located outside of the tap changer 208. In certain example embodiments, the tap changer 208 also includes a polarity switch 226. The polarity switch 226 is used to couple the load bushing 230 to either a first end 215*a* of the series windings 214 or a second end 215*b* of the series winding 214, which determines whether the series windings 214 has an additive or subtractive effect on the voltage.

In certain example embodiments, further detection of the voltage regulator 108 being in the neutral state employs the differential potential transformer 202 and/or the potential transformer 204. In certain example embodiments, the signals of differential potential transformers 202 coupled in the circuit are used to detect the neutral state. In certain example embodiments, the differential potential transformer 202 is used to measure the voltage difference across the source-side, or source bushing 232, of the voltage regulator and the load-side, or load bushing 230, of the voltage regulator. The measured voltage difference by the logic controller 256 and a neutral state determination is made by the logic controller 256. Specifically, if the measured voltage difference is below a set threshold, it is an indication the voltage regulator 108 is in the neutral state. Conversely, if the measured voltage difference is not below the threshold, then it is an indication that the voltage regulator 108 is not in the neutral state. The voltages at the source bushing 232 and the load bushing 230 of the voltage regulator can also be measured separately against a reference point, for instance, by using the control winding 210 and the potential transformer 204, and comparing the values.

It should be noted that FIG. 2 illustrates an example embodiment which includes several measurement means that can be used to detect that the voltage regulator 108 is in the neutral state. Specifically, in certain example embodiments, a subset of the measurement means illustrated in FIG. 2 are used to detect that the voltage regulator 108 is in the neutral state. For example, in an example embodiment, a differential signal which is used to detect neutral position is generated by the differential potential transformer 202. In another example embodiment, the detected differential signal between two potential transformers 210 and 204 connected between the source and the load, respectively, is used to determine the neutral state. In other words, in alternate embodiments not all of the measurement means illustrated in FIG. 2 will necessarily be present.

In certain example embodiments, the voltage regulator 108 is, a type A voltage regulator, in which the shunt winding 212 is coupled to the source 102. In such an embodiment, the system 100 includes the differential potential transformer 202, through which a neutral state can be detected. In certain example embodiments, the voltage regulator 108 is a type B voltage regulator, in which the shunt winding 212 is coupled to the load 106, and the control winding 210 to monitor the voltage on the load 106. In such an embodiment, the potential transformer 204 may not be included in the system 100.

In certain example embodiments, the tap changer 208 also includes a neutral position switch 224. The neutral position switch 224, is typically triggered when the neutral tap 218 is selected and coupled to the movable contacts 220. The neutral position switch 224, when triggered, provides a signal to the logic controller 256 indicative of the neutral tap 218 being selected. In certain example embodiments, the power system 100 includes a neutral position indicator light 234. The indicator light 234 may be powered directly from the neutral position switch 224 or from the logic controller 256, and lights up when the tap changer 208, and thus voltage regulator 108, is in the neutral state.

Under normal operating conditions (i.e., when the bypass switch 104 is in the off mode), the bypass switch 104 connects the power source 102 to the source bushing 232 through a source disconnect contact 236. The load 106 is connected to the load bushing 230 through a load disconnect contact 238. The bypass switch 104 further includes a bypass contact 240. The bypass contact 240 is coupled between the load 106 and the power source 102 such that when the bypass contact 240 is open, the load 106 is not electrically coupled to the power source 102 via the bypass contact 240. When the bypass contact 240 is closed, the load 106 is directly electrically coupled to the power source 102 via the bypass contact 240. Thus, in order to prevent a short circuit across the series winding 214, the bypass contact 240 remains open while the regulator is in service (i.e., not bypassed). In an example embodiment, the source disconnect contact 236, the load disconnect contact 238 and the bypass contact 240 may or may not be ganged together to operate through a single actuator 242. Specifically, the actuator 242, when operated on, either opens the disconnect contacts 236, 238 and closes the bypass contacts 240, or closes the disconnect contacts 236, 238 and opens the bypass contacts 240. In certain example embodiments, the actuator 242 is a mechanized actuator. In certain other example embodiments, the actuator 242 is an electrical switch.

In an example embodiment in which the actuator 242 is a mechanized actuator, the actuator 242 is controlled by the bypass switch controller 110. The bypass switch controller 110 includes a control switch 248, a power supply 246, and a safety relay 250. Specifically, in an example embodiment, the control switch 248, the safety relay 250, and the power supply 246 are coupled serially with the actuator 242. Thus, the actuator 242 is powered by the power supply 246, and actuated, when the control switch 248 and the safety relay 250 are both in the closed position. If either of the control switch 248 and the safety relay 250 are open, then an open circuit occurs and the actuator 242 is not powered. In certain, example embodiments, the default state of the actuator 242 is a normal state, in which the load disconnect contact 238 and the source disconnect contact 236 are closed and the bypass contact 240 is open (i.e., voltage regulator not bypassed). When actuator 242 goes into a bypass state when it is powered, the load disconnect contact 238 and source disconnect contact 236 are opened and the bypass contact 240 is closed. Thus, in an example embodiment, both the control switch 248 and the safety relay have to be closed, or activated, for the actuator to be put into the bypass state.

The control switch 248 is activated when it is determined, either automatically or by, a user, that the voltage regulator 108 is to be bypassed and the load 106 is to be directly coupled to the power source 102. Thus, in certain example embodiments, the control switch 248 is coupled to and/or follows a button or the like or a user interface. In certain example embodiments, the control switch 248 is coupled to and/or responds to a signal from a processor or controller. In an example embodiment, the safety relay 250 is controlled by the logic controller 256. Specifically, the logic controller 256 generates a safe output signal when the controller detects that one or more safe bypass conditions are met. The safe output signal is sent to the safety relay 250 and activates the safety relay 250 to be a closed circuit component. Thus, when the control switch 248 is activated (i.e., closed), the circuit is completed and the actuator 242 is actuated. In an example embodiment, the safety relay 250 is disabled (i.e., open) by default when the controller 112 does not detect that bypass conditions are met and thus does not send the safe output signal to the safety relay 250. Thus, the safety relay 250 remains open when bypass conditions are not met, and the actuator 242 cannot be activated even if the control switch 248 is enabled. The safety relay 250 described herein is an example actuator 242 hocking mechanism. Various other implementations of an actuator 242 locking mechanism which disables the actuator 242 from being activated even when then control switch 248 is activated are applicable and considered to be within the scope of the disclosure.

As discussed above, in certain example embodiments, the logic controller 256 enables the safety relay 250 when one or more bypass conditions are met. The bypass conditions are determined from one or more of various inputs 252 to the logic controller 256. Most crucially, the logic controller 256 should verify, that the voltage across the load and source sides of a regulator bypass switch 104 is sufficiently small to eliminate the chance of a short circuit through the bypass switch 104 and voltage regulator 108. One method of verification of such is to utilize a differential potential transformer 202 or a similar measurement device to directly measure the difference in potential between the load bushing 230 and the source bushing 232. Another method of verification is to measure the voltages at the source and load sides of the voltage regulator 108 separately against a reference point, for example, using the control winding 210 and the potential, transformer 204, and comparing the values. Additionally, resistive dividers, capacitive dividers, and other commonly used voltage measurement means may be similarly used. Additionally, in certain example embodiments, when the voltage regulator 108 is currently being bypassed, the bypass switch 104 also cannot be switched out of the bypass position without proper output from the voltage regulator 108.

In certain example embodiments, in addition to detecting that the source and load voltages 232, 230 are substantially similar, certain other bypass conditions may be required to be met prior to determining that a safe bypass condition exists. For example, one such bypass condition is that the neutral position switch 224 is triggered, indicating that the movable contacts 220 of the tap changer 208 are positioned on the neutral tap 218. Further, another such bypass condition may be verification that a voltage regulator controller 112 is in an off-line mode so that voltage regulator 108 may, not switch tap positions 214 until placed online. In certain example embodiments, the power supply 246 and/or the control switch 248 are also communicatively coupled to the logic controller 256 to prevent bypassing if all safety requirements are not met. Further, in certain example embodiments, a timer or remote control could be incorporated into the logic controller 256 to allow personnel to be in a remote/secure, location when the bypass switch 104 is operated. Additionally, in certain example embodiments, the bypass switch 104 includes a bypass position switch 258. The bypass position switch 258 is linked to the bypass contacts 240 and provides feedback to the logic controller 256 and/or the voltage regulator controller 112 regarding the position of the bypass contacts 240. Thus, the voltage regulator controller 112 is inhibited from switching tap positions 214 unless the bypass contacts 240 are open. In certain example embodiments, the logic controller 256 and the voltage regulator controller 112 are separate controllers that are communicatively coupled. In certain other example embodiments, the logic controller 256 and the voltage regulator controller 112 are one and the same. In certain example embodiments, the bypass switch controller 110, the logic controller 112, and the voltage regulator controller 256, or any subset thereof, are implemented together as one subsystem. For example, in an embodiment, the bypass switch controller 110 and the voltage regulator controller 256 are activated by the logic controller 112, and the bypass switch controller 110 operates the bypass switch 104.

Figure 3:
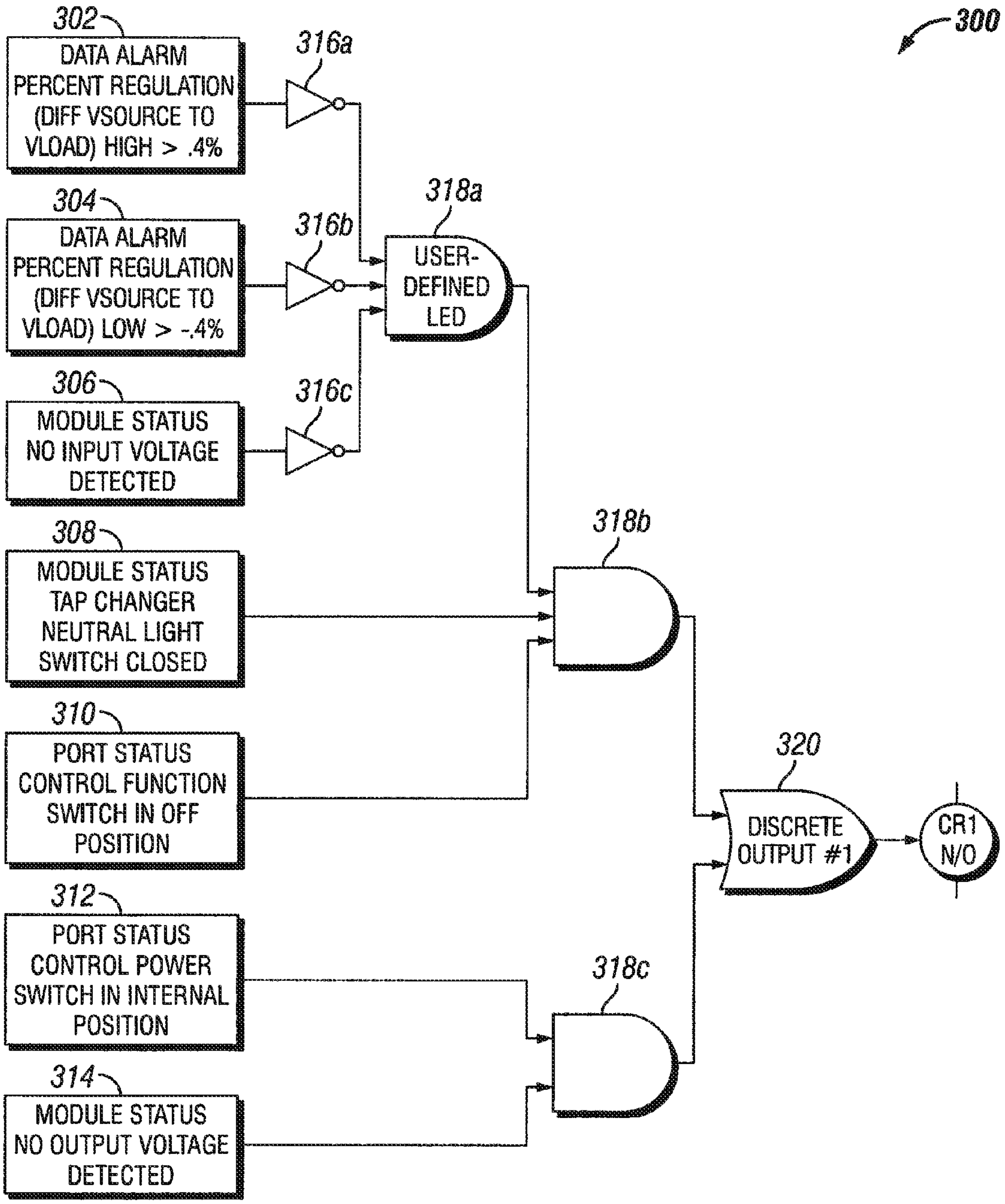
FIG. 3 illustrates an example logic diagram for determining a safe bypass condition, in accordance with certain example embodiments.

FIG. 3 illustrates an example logic diagram 300 for establishing a safe bypass condition in the controller 112 or 256. In an example embodiment, in order to establish a safe bypass condition, and allow bypassing of the voltage regulator 108, several measurements or states are measured and/or detected. In an example embodiment, such measurements or states include a first percentage threshold 302, a second percentage threshold 304, an input voltage module status 306, a tap changer module status 308, a control function switch off status 310, a control power switch internal status 312, and an output voltage module status 314. In an example embodiment, such measurements or states are expressed in binary logic (i.e., yes/condition met or no/condition not met). Specifically, with regard to the first percentage threshold 302 input, if the measured difference between the source voltage and the load voltage is higher than 0.4%, a logic ON is achieved. Otherwise, the input is a logic OFF. Likewise, with regard to the second percentage threshold 304, if the measured difference between the source voltage and the load voltage is lower than −0.4%, then a logic ON is achieved. With regard to the input voltage module status 306, if no input voltage into the power system 100 is detected, a logic ON is achieved. Next, each of these three outputs are put through respective NOT gates 316*a*, 316*b*, 316*c* such that their logic states are flipped. The outputs of the NOT gates 316*a*, 316*b*, 316*c* are then put through a first AND, gate 318*a*. Thus, in order for the first AND gate 318*a* to produce a logic ON, the difference between the source voltage must not be higher than 0.4% (block 302), the difference between the source voltage must not be lower than −0.4% (block 304), and there must be input voltage detected (block 306). Thus, an ON state at the first AND gate 318*a* is indicative of a set of bypass conditions being met. In certain example embodiments, the first AND gate 318*a* is also tied to a user-defined LED which lights up when the AND gate 318*a* is in the ON state.

A second AND gate 318*b* receives a state input from the first AND gate 318*a* as well as the tap changer module status 308 and the control switch off status 310. Specifically, for the second AND gate 318*b* to produce an ON output, the first AND gate 318*a* must be ON, the tap changer neutral switch (block 308) must be closed, producing an ON output, and the control switch (block 310) must be off, producing an ON output.

The output of the second AND gate 318*b* is sent to an OR gate 320 along with the output of a third AND gate 318*c*. In order for the third AND gate 318*c* to produce an ON state, a control power switch of the voltage regulator 108 must be in an internal position (block 312) and no output voltage (block 314) from the control winding 210 is detected. In certain example embodiments, the control power switch of the voltage regulator 108 is either in the internal position or an external position. The internal position is an indication that the potential transformer sensing inputs 202, 204, and 210 are being received internally under normal operation. The external position is an indication that the potential transformer sensing inputs 202, 204, and 210 are not receiving power internally. In order to provide any operation of the voltage regulator 108 when it is bypassed, the voltage regulator 108 must be coupled to an external supply for control and motor power. Thus, an ON state at the control power internal status 312 is indicative of the needed potential transformer signals being online. The third AND gate 318*c* is in the ON state when there is no output voltage detected at the control winding 210 and the voltage regulator 108 is receiving proper potential transformer signals. Typically, when both of these conditions are met, it is an indication that the power system 100 is not powered or the power source 102 is not providing any power, and there is no voltage in the power system 100.

In an example embodiment, an ON output at the OR gate 320 is generally an indication that the overall safe bypass conditions are met, and the safety relay 250 is enabled, allowing the voltage regulator 108 to be bypassed if needed. Thus, in order for the OR gate 320 to be in an ON state, at least one of the second AND gate 318*b* and the third AND, gate 318*c* must be in the ON state. If the power system 100 is detected to be unpowered and no voltage is provided, the safety relay 250 is enabled. On the other hand, if conditions 302, 304, 306, 308, and 310, which generally relate to ensuring that the tap changer 208 is in the neutral position 218 and the voltage difference between the load side 230 and the source side 232 is below a certain threshold, indicate the presence of power or voltage, then the safety relay 250 will not be enabled and the voltage regulator 108 cannot be bypassed. In certain example embodiments, a subset of such conditions may be employed and additional conditions may be employed.

Figure 4:
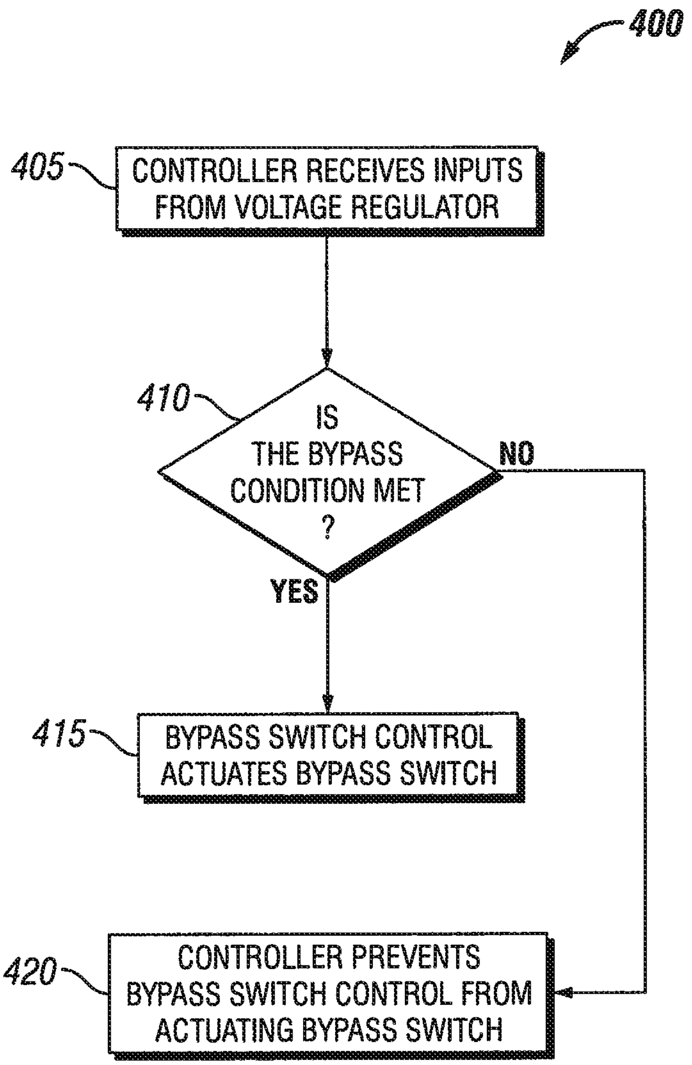
FIG. 4 illustrates an example method for determining whether a bypass switch control may actuate a bypass switch in accordance with certain example embodiments.

In FIG. 4, an example method 400 is illustrated for determining whether a bypass switch control 110 may actuate a bypass switch 104. In alternate embodiments other methods may be used for determining whether a bypass switch control may actuate a bypass switch. Referring now to FIGS. 1 through 4, in step 405 of example method 400, a logic controller 256 receives inputs from the voltage regulator 108. For example, the received inputs can include whether an input voltage is detected at the voltage regulator, a measured difference between the source voltage and the load voltage, a status of the tap changer neutral switch, and a status of a control switch. In step 410 of example method 400, the logic controller 256 determines based on the received inputs whether the bypass condition is met. For example, in one embodiment, all of the inputs received must satisfy a certain condition in order for the bypass condition to be met. In alternate embodiments, the logic controller 256 may only require that certain received inputs satisfy certain conditions in order for the bypass condition to be met. If the bypass condition is met in step 410, the logic controller 256 permits the bypass switch control 110 to actuate the bypass switch 104 in step 415. Alternatively, if the bypass condition is not met, the logic controller 256 causes the bypass switch control 110 to be disabled thus preventing actuation of the bypass switch 104.

In certain example embodiments, the power system 100 includes a built-in bypass switch controller 110 and/or the logic controller 256. In certain example embodiments, the bypass switch controller 110 and/or the logic controller 256 are made as stand-alone devices that retro-fitted onto existing power systems or used interchangeably with more than one Although embodiments of the present disclosure have been described herein in power system.

Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A system with voltage regulator bypass, comprising:

a voltage regulator comprising at least one transformer and a tap changer;

a bypass switch coupled to the voltage regulator, and between a source and a load at a bypass contact, the bypass switch comprising a source disconnect contact, a load disconnect contact, and an actuator, the bypass switch further comprising a first state and a second state, wherein the actuator only permits the bypass switch to be in one of the first state and the second state, wherein in the first state, the bypass switch electrically couples the source to the voltage regulator through the source disconnect contact and the voltage regulator to the load through the load disconnect contact, establishing a conductive path between the source and load via the voltage regulator; and wherein in the second state, the bypass switch electrically decouples the voltage regulator from the source at the source disconnect contact, electrically decouples the voltage regulator from the load at the load disconnect contact, and electrically couples the source directly to the load through the bypass contact, bypassing the voltage regulator;

a bypass switch controller coupled to the bypass switch, wherein the bypass switch controller controls whether the bypass switch is put into the first state or the second state; and a logic controller coupled to the bypass switch controller, wherein the logic controller prevents the bypass switch controller from actuating the actuator that moves the bypass switch from the first state into the second state unless one or more bypass conditions are met, wherein the one or more bypass conditions include that the logic controller has received a signal from a neutral position switch indicating a movable contact of the tap changer is in a neutral tap position.

2. The system with voltage regulator bypass of claim 1, wherein the voltage regulator comprises a load side voltage value and a source side voltage value, and wherein the one or more bypass conditions comprises a first condition wherein an absolute difference between the load side voltage value and the source side voltage value is lower than a set threshold.

3. The system with voltage regulator bypass of claim 2, wherein the at least one transformer is a differential potential transformer, and the absolute difference between the load side voltage value and the source side voltage value is measured via the differential potential transformer.

4. The system with voltage regulator bypass of claim 1, wherein the tap changer comprises a variable winding and a movable contact, wherein the variable winding comprises a plurality of tap positions, and wherein the movable contact is movable between the plurality of tap positions.

5. The system with voltage regulator bypass of claim 4, wherein a second condition of the one or more bypass conditions is when the movable contact is in the neutral tap position.

6. The system with voltage regulator bypass of claim 5, wherein when the neutral position switch is triggered is a third condition of the one or more bypass conditions; and the system further comprising a bypass position switch coupled to the bypass contact, the actuator and the logic controller, the bypass position switch preventing the tap changer from moving from the neutral tap position when the bypass contact is closed.

7. The system with voltage regulator bypass of claim 5, further comprising:

a neutral position indicator lamp, wherein the neutral position indicator lamp turns on when the movable contact is in the neutral tap position, and wherein the one or more bypass conditions comprise a fourth condition wherein the neutral position indicator lamp is turned on.

8. The system with voltage regulator bypass of claim 1, wherein the one or more bypass conditions comprises a fifth condition wherein no output voltage is detected from the voltage regulator and the voltage regulator is not currently bypassed.

9. The system with voltage regulator bypass of claim 1, wherein the bypass switch controller comprises a control switch, a power supply, and a safety relay, wherein the actuator only receives power from the power supply and moves the bypass switch from the first state to the second state when the logic controller sends a safe output signal to the safety relay and the control switch is activated.

10. A voltage regulator bypass controller, comprising:

a logic controller configured to couple to a bypass switch controller and a voltage regulator, wherein the bypass switch controller comprises a power supply, a control switch, and a safety relay, wherein the bypass switch controller is coupled to and controls a bypass switch, the bypass switch comprising a source disconnect contact, a load disconnect contact, and a bypass contact coupled to an actuator, wherein the bypass switch is coupled to the voltage regulator, and between a source and a load, the bypass switch comprising a first state and a second state, wherein in the first state, the bypass switch electrically couples the source to the voltage regulator through the source disconnect contact and the voltage regulator to the load through the load disconnect contact, establishing a conductive path between the source and load via the voltage regulator, wherein in the second state, the bypass switch electrically couples the source directly to the load through the bypass contact, bypassing the voltage regulator, wherein actuating the bypass switch puts the bypass switch into the second state, and wherein when the logic controller is coupled to the bypass switch controller, the logic controller prevents the bypass switch controller from actuating the bypass switch unless one or more bypass conditions are met, wherein one or more bypass conditions include a first condition wherein the logic controller has received a signal from a neutral position switch indicating a movable contact of the tap changer is in the neutral tap position.

11. The voltage regulator bypass controller of claim 10, wherein the voltage regulator comprises a load side voltage value and a source side voltage value, and wherein the one or more bypass conditions comprises a second condition wherein an absolute difference between the load side voltage value and the source side voltage value is lower than a set threshold.

12. The voltage regulator bypass controller of claim 10, wherein the one or more bypass conditions comprises a third condition wherein no output voltage is detected from the voltage regulator and the voltage regulator is not currently bypassed.

13. The voltage regulator bypass controller of claim 10, further comprising a bypass position switch coupled to the bypass contact, the actuator and the logic controller, the bypass position switch preventing the tap changer from moving from the neutral tap position when the bypass contact is closed.

14. A method of bypassing a voltage regulator, comprising:

receiving at a logic controller a plurality of inputs from a voltage regulator;

determining if one or more bypass conditions has been met based at least on the inputs from the voltage regulator, wherein the one or more bypass conditions includes a first bypass condition comprising receiving at the logic controller a signal from a neutral position switch indicating a movable contact of the tap changer is in the neutral tap position wherein the logic controller permits a bypass switch controller to actuate an actuator of a bypass switch, the actuator permitting the bypass switch to be in one of a first state and a second state, wherein if the bypass condition is met, the actuator decoupling a source from the voltage regulator at a source disconnect contact, the actuator decoupling a load from the voltage regulator at a load disconnect contact, the actuator coupling the source directly to the load through a bypass contact of the bypass switch, and putting the voltage regulator into a bypassed state such that the bypass switch is in the second state; and if the bypass condition is not met, the logic controller preventing the bypass switch controller from actuating the bypass switch, thereby maintaining a coupling of the source to the voltage regulator through the source disconnect contact and a coupling of the voltage regulator to the load through the load disconnect contact, and preventing the voltage regulator from being put into the bypassed state such that the bypass switch remains in the first state.

15. The method of bypassing a voltage regulator of claim 14, wherein determining if a bypass condition has been met comprises determining if a difference between a source bushing of the voltage regulator and a load bushing of the voltage regulator is within a predetermined threshold.

16. The method of bypassing a voltage regulator of claim 15, wherein determining if a difference between the source bushing of the voltage regulator and the load bushing of the voltage regulator is within a predetermined threshold comprises measuring a differential voltage across a differential potential transformer of the voltage regulator.

17. The method of bypassing a voltage regulator of claim 14, wherein permitting the bypass switch controller to put the voltage regulator into the bypassed state comprises:

the logic controller sending a signal to a relay in the bypass switch controller, wherein the signal causes the relay to be enabled and a control switch to be closed, and wherein the enabled relay allows a power supply of the bypass switch controller to actuate the actuator thereby putting the voltage regulator into the bypassed state.

18. The method of bypassing a voltage regulator of claim 14, wherein the bypass condition comprises a second condition wherein no output voltage is detected from the voltage regulator and the voltage regulator is not currently bypassed.

19. The method of claim 14, wherein a bypass position switch is coupled to the bypass contact, the actuator and the logic controller, the bypass position switch preventing the tap changer from moving from the neutral tap position when the bypass contact is closed.

* * * * *